Oct. 22, 1968 J. J. A. ROBILLARD 3,406,572

PRESSURE TRANSDUCER

Filed Nov. 25, 1964

INVENTOR.
JEAN J. A. ROBILLARD

BY Darby & Darby

ATTORNEYS

United States Patent Office
3,406,572
Patented Oct. 22, 1968

3,406,572
PRESSURE TRANSDUCER

Jean J. A. Robillard, 381 Elliot St.,
Newton, Mass. 02158

Filed Nov. 25, 1964, Ser. No. 413,744
12 Claims. (Cl. 73—398)

This invention relates to pressure transducers. More particularly, this invention relates to a novel means and method for converting the pressure of a gas to a measurable electrical signal.

An important feature of a transducer made in accordance with the invention is high sensitivity. Other features include good stability and reproducibility.

It is a basic principle of the semi-conductor arts that the introduction of a specified impurity into a particular semi-conductor will result in the creation of either excess electrons or electron holes. Substances which create the above effects are known as donor and acceptor impurities, respectively. An electron hole created by an acceptor impurity is the absence of a valence electron from an electron-pair bond between neighboring atoms of the semi-conductor. Such holes (or vacancies) represent the absence of an electron (considered a negative charge), and this hole can move between adjacent electron-pair bonds effectively as a free positive charge. Semi-conductors which include acceptor impurities are known as P-type semi-conductors, the P referring to the net positive charge of the electron hole.

The present invention is based upon the discovery that a suitably dimensioned thin film of semi-conductor material, containing sufficient acceptor impurities, will undergo a measurable change in electrical resistance when exposed to a variable gas pressure.

This change in conductivity of the semi-conductor is due to the adsorption of gas molecules at the surface of the semi-conductor, and the ionization of the gas atoms by nearby electron holes in the semi-conductor material. The latter occurs when the hole of a P-type semi-conductor is filled by an electron from a nearby gas atom, thus leaving the atom with a net negative charge.

It can be shown that the adsorption of gas molecules at the surface of a semi-conductor is a function of pressure. Since the conductivity of the semi-conductor is dependent upon the number of electrons received by nearby gas atoms, which in turn is dependent upon the number of gas molecules adsorbed by the semi-conductor, the conductivity of the semi-conductor will vary as a function of the gas pressure.

By increasing the amont of acceptor impurities and thus the number of electron holes in the semi-conductor material, the variation of semi-conductor conductivity can be greatly increased. To utilize this change in conductivity with optimum results, it is necessary that the volume of the semi-conductor in which the gas molecules are adsorbed, be relatively large with respect to the total volume of the semi-conductor.

The manner in which the principles enumerated above are employed in the practice of the invention is explained below with reference to the attached drawings, wherein.

Figure 1:
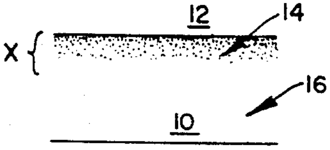
FIGURE 1 is a diagrammatic cross-sectional view of a semi-conductor film for explanatory purposes.

In FIGURE 1 the numeral 10 represents a semi-conductor material having its upper surface exposed to a gas 12. As diagrammatically represented by the dotted area 14, a quantity of the gas molecules 12 have been adsorbed at the surface of semi-conductor 10. Zone 14 of adsorbed molecules may be considered to extend into semi-conductor 10 to a depth X, the portion of the semi-conductor in which there are no adsorbed molecules being indicated at 16. Since it is zone 14 in which ionization of the gas atoms causes an increase in conductivity of the semi-conductor, if a film of semi-conductor material of a thickness X is exposed to the gas 12, the conductivity of substantially the entire semi-conductor film will vary as a function of gas pressure. Under these conditions the change of conductivity may be easily measured to provide an indication of the gas pressure.

Figure 2:
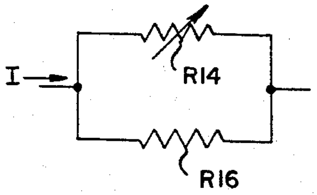
FIGURE 2 is a schematic diagram of the equivalent circuit of the semi-conductor film illustrated in FIGURE 1.

The importance of the dimensional requirements of the semi-conductor film may be clearly understood with reference to FIGURE 2, which illustrates schematically in terms of lumped constants the electrical behavior of the semi-conductor material. In FIGURE 2 the resistance R14 represents the resistance of the zone 14 in which the gas molecules are adsorbed. Since it is the resistance of zone 14 which varies as a function of pressure, resistance R14 is shown as a variable resistance. Resistance. Resistance R16 is equivalent to the resistance of zone 16 in which no gas molecules are adsorbed, and is not variable since the resistance of this zone remains substantially constant regardless of pressure.

Resistances R14 and R16 are effectively connected in parallel, so that if a current I is applied to a junction of the two resistances, the greater portion of the current will flow through the smaller resistance. Because it is not possible to measure the current flowing in only one of the zones 14 or 16, it is necessary that resistance R14 be small with respect to resistance R16 so that the change in voltage across the parallel combination is determined almost entirely by the change of resistance R14. Resistance R16 may be effectively increased by decreasing the volume of zone 16. If it were possible to entirely dispense with zone 16, resistance R16 would be equivalent to an open circuit, and all of the input current I would flow through resistance R14, i.e., adsorption zone 14. Under these circumstances, the voltage drop across the semi-conductor material would be determined solely by the conductivity of adsorption zone 14, which, as explained above, is a function of gas pressure.

For the above purpose, it has been found that the thickness of the semi-conductor film should normally be less than ten microns.

Figure 3:
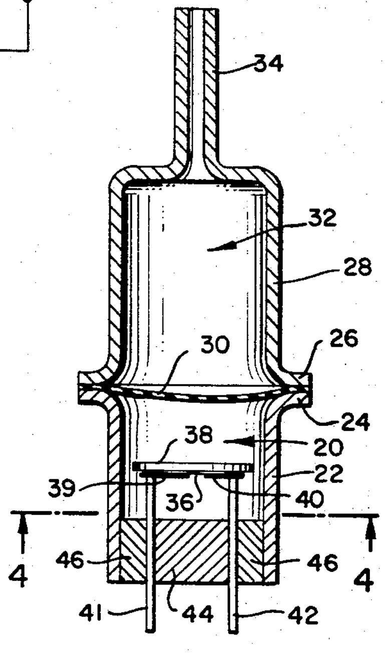
FIGURE 3 is a side sectional view of a pressure transducer according to the invention.
Figure 4:
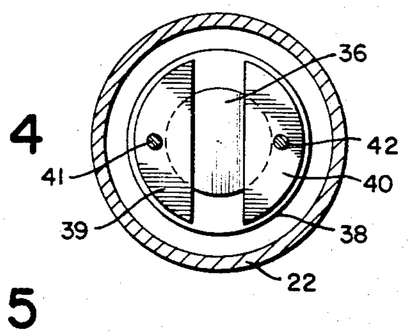
FIGURE 4 is a sectional view along the line 4—4 of FIGURE 3.

The adsorption and conductivity of the semi-conductor film also varies depending on the gas to which the semi-conductor is exposed. When measuring the pressure of a gas which is not active to the semi-conductor, and for purposes of uniformity, the gas surrounding the semi-conductor (the active gas) must be isolated from the gas pressure being measured. A construction for this purpose is illustrated in FIGURES 3 and 4, wherein a gas-tight chamber 20 is formed from a cylinder 22 including an upper flange 24 which engages the flange 26 of a cover member 28. A pressure transmitting diaphragm 30 isolates the gas-tight chamber 20 from the volume beneath cover 28. An input duct 34 opens into cover 32 to introduce a gas, the pressure of which is to be measured.

Chamber 20 contains an active gas, the response of which has been previously calibrated. Diaphragm 30 changes the volume of chamber 20 (and thus the pressure of the active gas) as a function of the gas pressure within cover 28, to thereby transmit the pressure being measured to the active gas contacting the semi-conductor. It is obvious that diaphragm 30 may be replaced by other pressure transmitting means such as a piston or the like.

As schematically illustrated, the transducer itself consists of a thin film of semi-conductor material 36 deposited on a mica disc 38, which is supported within gas-tight chamber 20 on two elongated electrode posts 39 and 40. A pair of electrodes consisting of two evaporated gold layers 41 and 42 are deposited on the thin film 36, and are electrically connected to the electrode posts 39 and 40, which extend from chamber 20 for connection to the external measuring or other equipment. The bottom of the chamber 20 is closed by means of a round central plug 44 cooperating with an annular seal 46. The illustrated parts may be secured together by conventional means which therefore have not been illustrated.

Figure 5:
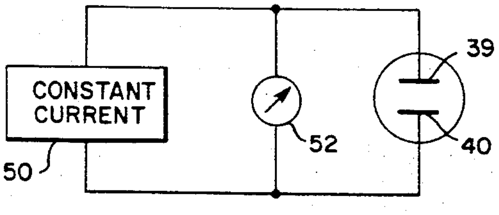
FIGURE 5 is a schematic diagram of a preferred circuit in which the transducer may be used.

To make the necessary measurements, electrodes 41 and 42 are connected across a source of constant current 50, as illustrated schematically in FIGURE 5. A voltmeter 52 records the voltage drop across the electrodes 41 and 42, which, as explained above, is determined almost exclusively by the resistance of adsorption zone 14. Since this resistance is proportional to the pressure of the active gas within chamber 20, in turn dependent upon the pressure to be measured applied to duct 34, the voltage measured by meter 52 provides an accurate measurement of the unknown gas pressure.

Figure 6:
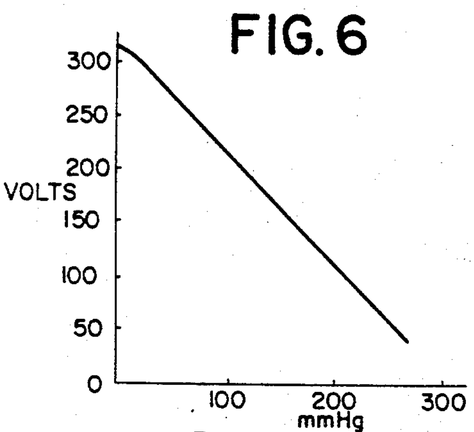
FIGURES 6 and 7 are graphs showing the results achieved with the transducer of FIGURES 3 and 4 operated in accordance with FIGURE 5.
Figure 7:
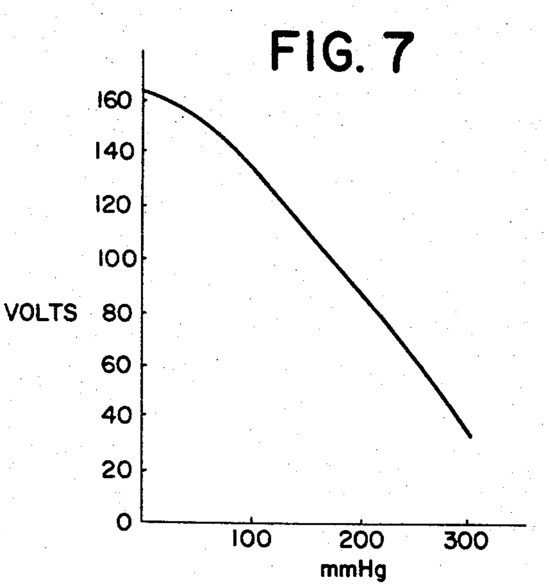

FIGURES 6 and 7 illustrate graphically the results achieved with a particular embodiment of the invention using the construction of FIGURES 3 and 4, and the circuit illustrated in FIGURE 5. In FIGURES 6 and 7 the vertical axes represent the voltage measured by meter 52, and the horizontal axes the pressure within gas-tight chamber 20 measured in millimeters of mercury by a manometer at inlet duct 34.

In both cases, the semi-conductor used was indium arsenide type P, doped with zinc having an acceptor density of $10^{-15}$ cubic centimeters. The active gas within chamber 20 was pure oxygen.

With respect to FIGURE 6, the film thickness was 0.02 micron; the area of the film exposed to the oxygen .0094 square centimeter and the active volume of the film $18.8 \times 10^{-8}$ cubic centimeters. The sensitivity of the transducer was about 0.83 v./v./mm. Hg.

With respect to FIGURE 7, the thickness of the film was 0.1 micron, the area exposed to the oxygen equal to .0031 square centimeter, and the active volume equal to $3.1 \times 10^{-7}$ cubic centimeters. The sensitivity was equal to about 0.5 v./v./mm. Hg.

The constant current generator 50 was a commercially available device manufactured by Electronic Measurement Inc., as Model C–162. Because of the high resistance of the thin film, it is desired to maintain the lowest possible current, higher current being detrimental to the sensitivity of the transducer since it increases the operating temperature. Typical constant current values range from one to five micro-amperes.

The invention is not limited to any particular semi-conductor since practically all semi-conductor materials will display sufficient change in conductivity when exposed to gas at certain pressures to be used in accordance with the invention. However, in addition to indium arsenide, it has been found that certain semi-conductor oxides are particularly suitable for use as the transducer of the invention. In particular, such oxides includes tellurium oxide ($TeO_2$), germanium oxide ($GeO_2$), chromium oxide ($Cr_2O_3$), magnesium oxide (MgO), cobalt oxide ($CO_2O_3$), bismuth oxide ($Bi_2O_3$), and tantalum oxide ($Ta_2O_5$).

In order to obtain good reproducibility of the phenomenon, the semi-conductor material should be monocrystalline or include relatively large monocrystalline areas. Monocrystalline films can be prepared from a vapor phase onto a crystalline substrate which will induce its own structure to the growing film as explained in Swedish Patent No. 144,030. If this substrate is soluble, it can thereafter be eliminated by dissolution in a proper solvent, and the film transferred on the mica disk 38.

Figure 8:
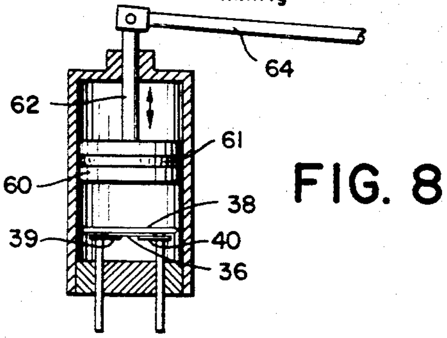
FIGURE 8 is a side sectional view of another embodiment of the invention.

The invention would have equal utility in situations in which the gas pressure is not measured as an end in itself, but rather as an intermediate step in an overall process. For example, in FIGURE 8 membrane 30 is replaced by a piston 60 and ring 61, mechanically coupled by a rod 62 to a member 64, displacement of which it is desired to measure. Since displacement of member 64 will also cause movement of the piston 60, thereby varying the pressure of the active gas within chamber 20, the change in voltage across electrode posts 41 and 42 will be an analog of the mechanical displacement of the piston and the member 64. Thus, the present invention would have utility in any situation in which it is desired to convert gas pressure into an electrical voltage regardless of the ultimate intent.

The above description has been given in general terms in the interest of simplicity and to facilitate an understanding of the principles behind the invention. A more rigorous analysis of these principles is presented below.

According to a well-known theory, gas atoms can be ionized by a nearby vacancy in a semi-conductor. This principle is the basis of the oxidation of most metals exposed to air where the atoms of oxygen in the air are ionized by vacancies existing in a thin semi-conductor film on the surface of the metal. The quantum mechanical theory of oxidation requires that the wave function of the nearby vacancy, defined by the Schrodinger equation:

$$\Delta\psi - \frac{8\pi^2 mi}{h^2} V\psi - \frac{4\pi mi}{h} \frac{\delta\psi}{\delta t} = 0$$

interpenetrates the wave function of an oxygen atom nearby. Mathematically, this can be expressed by a modified wave function representing the system vacancy-oxygen atom, which can be represented by the modified equation:

$$\Delta\psi - \frac{8\pi^2 mi}{h^2}(V_1 + V_2)\psi - \frac{4\pi mi}{h} \frac{\delta\psi}{\delta t} = 0$$

where $V_1$ is the potential function of the vacancy and $V_2$ the potential function of the oxygen atom. When a solution exists to this last equation, the ionization of the oxygen atom is possible, and its adsorption into the corresponding vacancies will take place. As a result of this adsorption, an electron is promoted into the conduction band of the semi-conductor, and an increase in conductivity of the semi-conductor may be observed.

The number of atoms adsorbed is a function of (a) the total number of atoms existing in a certain volume close to the surface of the semi-conductor where the wave functions of the holes do not vanish, and (b) the kinetic energies of the atoms. Since both (a) and (b) are functions of the gas pressure, the quantity of gas adsorbed is also a function of gas pressure.

The change in conductivity is related to the number of defects N created in the semi-conductor material as a result of the adsorption of the gas (i.e., the number of gas molecules adsorbed). Therefore, N is a function of the gas pressure, and the conductivity of the semiconductor may be expressed as follows:

$$\sigma = ne\mu \qquad (1)$$

$n$=the total number of free carriers
$e$=the electron charge
$\mu$=the mobility of the carriers Also, the total number of free carriers is a function of the total number of defects as related by the deBoer and Van Geel formula:

$$\frac{n(N - N_e + n)}{N_e - n} = V\left[\frac{2\pi mkT}{h^2}\right]^{3/2} e^{-\frac{E}{kt}} \qquad (2)$$

where:

$N$=Total number of defects per unit volume $N_e$=Total number of electrons per unit volume $E$=Energy required to raise an electron from an impurity level into the conduction band $m$=Atomic mass $k$=Boltzman's constant $h$=Planck's constant The conductivity $\sigma$ (1) will then vary with the total number of defects N and, therefore, the quantity of gas adsorbed will become a measure of the pressure P.

It can also be shown that the adsorption and the resulting change in conductivity are reversible within the proper range of temperature and pressure. This situation takes place when the kinetic energy of the molecules of gas is approaching the energy of adsorption of a molecule onto the semiconductor.

While preferred embodiments of the invention have been described above, it will be understood that these are illustrative only, and the invention is limited solely by the appended claims.

What is claimed is:

1. A pressure transducer, comprising a thin film of semi-conductor material containing an acceptor impurity, the thickness of said thin film being such that the adsorption of gas molecules on the surface of said thin film substantially affects the resistance thereof, at least one surface of said film being exposed to said gas, and electrode means for passing a current through a portion of said semi-conductor material in which molecules of said gas have been adsorbed, whereby the pressure of said gas may be measured as a function of the conductivity of said semi-conductor portion due to the exchange of electrons between said adsorbed molecules and acceptor material.

2. A pressure transducer according to claim 1, wherein said semi-conductor is substantially monocrystalline.

3. A pressure transducer according to claim 1, including means for passing a substantially constant current through said semiconductor material in a direction parallel to the surface thereof.

4. Apparatus for measuring the pressure of a gas, comprising a thin film of semi-conductor material containing an acceptor impurity, the thickness of said thin film being such that the adsorption of gas molecules on the surface of said thin film substantially affects the resistance thereof, at least one surface of said film being exposed to said gas, means for varying the pressure of said gas, generator means for measuring the electrical resistance of said thin film, and output means responsive to said generator means for manifesting the pressure of said gas.

5. A pressure transducer, comprising a gas-tight chamber, a thin film of semi-conductor material mounted in said chamber, the thickness of said thin film being such that the adsorption of gas molecules on the surface of said thin film substantially affects the resistance thereof, said semi-conductor material including an acceptor impurity to thereby create electron holes in said semi-conductor material, electrode means electrically connected to a single surface said semi-conductor material for passing an electrical current through said semi-conductor material, at least one surface of said semi-conductor material being exposable to a variable pressure gas within said gas-tight chamber, means for varying the pressure of the gas within said chamber and thereby the amount of gas adsorbed by said thin film, and means for producing an electrical signal dependent upon the exchange of electrons between said adsorbed gas and said electron holes.

6. A pressure transducer according to claim 5, including means for passing a substantially constant current flow through said semi-conductor material.

7. Apparatus according to claim 6, including means for measuring the voltage drop across a portion of said semi-conductor material exposed to said gas to thereby indicate the pressure of said gas.

8. A device according to claim 7, wherein said gas-tight chamber includes a movable member for changing the volume of said chamber to vary the pressure of the gas within said chamber.

9. A device according to claim 8, wherein said movable member comprises a resilient diaphragm.

10. A device according to claim 8, wherein said movable member comprises a piston.

11. A pressure transducer according to claim 5, wherein said electrode means extend electrically to a position exterior of said chamber.

12. A method of measuring the pressure of a gas, comprising the step of measuring the electrical conductance of a thin semi-conductor film containing acceptor impurities, the thickness of said thin film being such that the adsorption of gas molecules on the surface of said thin film substantially affects the resistance thereof due to the exchange of electrons between the adsorbed gas and the electron holes of said semiconductor film.

References Cited

UNITED STATES PATENTS

| | | | |
|---|---|---|---|
| 2,358,467 | 9/1944 | Minter | 73—399 |
| 3,139,754 | 7/1964 | Dore | 73—398 |
| 3,245,265 | 4/1966 | Peters | 73—398 |
| 3,270,562 | 9/1966 | Ehrenreich et al. | 73—398 |

DAVID SCHONBERG, *Primary Examiner.*

DONALD O. WOODIEL, *Assistant Examiner.*